US007074736B2

(12) United States Patent
Lundquist et al.

(10) Patent No.: US 7,074,736 B2
(45) Date of Patent: Jul. 11, 2006

(54) HYDROZIRCONATED MATRIX AND PROCESS FOR POLYOLEFIN PRODUCTION

(75) Inventors: Eric Gustave Lundquist, North Wales, PA (US); Jennifer Annette Reichl, St. Davids, PA (US); James Charles Bohling, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/973,261

(22) Filed: Oct. 9, 2001

(65) Prior Publication Data
US 2002/0052536 A1  May 2, 2002

Related U.S. Application Data

(60) Provisional application No. 60/244,322, filed on Oct. 31, 2000.

(51) Int. Cl.
*C08F 6/64* (2006.01)
(52) U.S. Cl. .................. 502/108; 502/109; 502/152; 502/154; 502/103; 502/134; 526/160; 526/943; 526/165
(58) Field of Classification Search ............... 502/108, 502/109, 152, 154; 526/160, 943
See application file for complete search history.

(56) References Cited

U.S. PATENT DOCUMENTS

| 4,382,124 | A | 5/1983 | Meitzner et al. ............... 521/38 |
| 4,808,561 | A | 2/1989 | Welborn, Jr. ................. 502/104 |
| 5,064,802 | A | 11/1991 | Stevens et al. .............. 502/155 |
| 5,126,301 | A | 6/1992 | Tsutsui et al. ............... 502/108 |
| 5,198,401 | A | 3/1993 | Turner et al. ................ 502/155 |
| 5,346,925 | A | 9/1994 | Sugano et al. ................. 521/54 |
| 5,362,824 | A | 11/1994 | Furtek et al. ................ 526/114 |
| 5,438,100 | A | 8/1995 | Shinozaki et al. ........... 525/240 |
| 5,455,214 | A | 10/1995 | Furtek et al. ............... 502/109 |
| 5,461,017 | A | 10/1995 | Furtek et al. ............... 502/109 |
| 5,476,903 | A | 12/1995 | Shinozaki et al. ........... 525/232 |
| 5,478,890 | A | 12/1995 | Shinozaki et al. ........... 525/240 |
| 5,498,582 | A | 3/1996 | Krause et al. ............... 502/103 |
| 5,504,049 | A | 4/1996 | Crowther et al. ............ 502/117 |
| 5,599,761 | A | 2/1997 | Turner ......................... 502/152 |
| 5,942,586 | A | 8/1999 | Herrmann et al. ........... 526/160 |
| 6,002,035 | A | 12/1999 | Chiang et al. |
| 6,028,150 | A | 2/2000 | Chiang et al. |
| 6,232,420 | B1 | 5/2001 | Turner ..................... 526/348.6 |
| 6,300,468 | B1 | 10/2001 | Bretz et al. ................. 528/497 |

FOREIGN PATENT DOCUMENTS

| DE | 19941460 A1 | 3/2001 |
| EP | 0468537 B1 | 11/1996 |
| EP | 0561479 B1 | 11/1996 |
| EP | 0633272 B1 | 9/1997 |
| EP | 069661 B1 | 5/1998 |
| EP | 0563917 B1 | 5/1998 |
| EP | 0767184 B1 | 8/1999 |
| EP | 0949278 A2 | 10/1999 |
| EP | 0949279 A2 | 10/1999 |
| EP | 1181979 | 2/2002 |
| WO | WO91/09882 | 7/1991 |
| WO | WO95/23816 | 9/1995 |

OTHER PUBLICATIONS

Reactive & Functional Polymers 36 (1998) 1-16, "Polymers with pendant vinyl groups, including poly(divinylbenzene-co-ethylvinylbenzene)", K. Lise Hubbard, James A. Finch, Graham D. Darling.
Macromolecules 1997, 30 2868-2875, "Quantitative Solid State 13C NMR Studies of Highly Cross-Linked Poly(divinylbenzene) Resins", Robert V. Law, David C. Sherrington, and Colin E. Snape.
Chem. Rev. 200, 100, 1347-1376, "Heterogeneious Single Site Catalysts for Olefin Polymerization", Gregory G. Hlatky.
Chem. Rev. 2000, 100, 1205-1221, "Effect of the Nature of Metallocene Complexes of Group IV Metals on Their Performance in Catalytic Ethylene and Propylene Polymerization", Helmut G. Alt and Alexander Koeppl.
Reactive & Functional Polymers 36 (1998) 17-30, "The Preparation and Characteristics of poly(divinylbenzene-co-ethylvinylbenzene), including Amberlite XAD-4. Styrenic resins with pendant vinylbenzene groups", K. Lise Hubbard, James A. Finch, Graham D. Darling.
Baukova, E. Yu. et al. Interaction of Zirconocene Hydrides With Polybutadiene. Chemical Abstracts Service, Columbus, Ohio, US. Database accession No. 119:96375 XP002247752 (abstract), & Metalloorganicheskaya Khimiya (1992), 5(6), 1386-90.
Endo, June., et al, "CAME (computer aided molecular engineering). Applications to polymerization catalysts and polymer design" . Chemical Abstracts Service, Columbus, Ohio, US. Database accession No. 122:10703 XP0022247753 (abstract), & CHEMITOPIA (1994), 14, 20-7.
Matisons, Janis G., et al. "Supported Metallocences for Olefin Polymerization." Book of Abstracts, 218th ACS National Meeting, New Orleans, Aug. 22-26 (1999), INOR-526 Publisher: American Chemical Society, Washington, D.C., XP009013883.
Brunner, Alexis R. et al. "Single source polymeric precursors to boron—and zirconium—modified silicon carbide ceramics." Abstracts of Papers—American Chemical Society (2000), 220th , INOR—423, XP009013883.

*Primary Examiner*—Caixia Lu

(57) ABSTRACT

A hydrozirconated matrix for the production of polyolefins is disclosed. The hydrozirconated matrix is prepared from the reaction of an organozirconium composition and an olefin based material. A process is described for using the hydrozirconated matrix to prepare a range of polyolefin products.

15 Claims, No Drawings

HYDROZIRCONATED MATRIX AND PROCESS FOR POLYOLEFIN PRODUCTION

CROSS REFERENCE TO RELATED APPLICATIONS

This is a non-provisional application of prior U.S. provisional application Ser. No. 60/244,322 filed Oct. 31, 2000.

The present invention relates to catalytic olefin polymerization and a general process for preparing a variety of polyolefin products using a range of organometallic zirconium catalyst systems.

BACKGROUND OF INVENTION

Commercial catalytic processes for the production of polyolefins, such as polyethylene and polypropylene, have traditionally relied on the use of heterogeneous, Ziegler-Natta catalyst systems. Typical catalyst systems for polyethylene are exemplified by Chromium supported on silica and Titanium on $MgCl_2$. Although the catalyst systems are quite active and can produce high molecular weight polymers, they tend to produce a broad molecular weight distribution of a particular polyolefin and are poor at incorporating alpha olefins such as 1-hexene and 1-octene. When making copolymers, these catalysts typically produce polyethylene resins of moderately broad to very broad molecular weight distribution, as characterized by their molecular weight distribution of greater than 6. Lack of a narrow molecular weight in such catalyst systems is believed due to the presence of more than one type of catalytic site.

More recently, olefin polymerization catalyst systems containing well defined single reactive sites have been developed. Single-site catalysts allow for the production of polymers with varied molecular weights, narrow molecular weight distributions and the ability to incorporate large amounts of comonomers. Metallocene catalysts based on Group 4 metals of the Periodic Table (IUPAC nomenclature) containing cyclopentadienyl groups are examples of these active single-site catalysts. Such catalysts have been disclosed in U.S. Pat. Nos. 5,064,802; 5,198,401 and 5,324,800.

The mechanism of olefin polymerization has been the subject of much study and is believed to involve generation of an unsaturated, electron deficient metal species, which coordinates olefins to form intermediate alkyl olefin complexes, then subsequently undergoes rapid alkyl migration to afford a growing polymer chain. Olefin coordination followed by migration (insertion) continues until a termination step occurs or the reaction is stopped.

Several methods are currently employed to generate and stabilize the unsaturated electron deficient metal catalysts of such systems. The activation of transition metal complexes to afford stabilized, unsaturated transition metal catalysts for the polymerization of olefins is a key part of this mechanism. Several methods are currently employed to generate and stabilize the unsaturated, electron deficient metal catalysts of such systems and include halide abstraction, protonation followed by reductive elimination of an alkane or hydrogen, or oxidation. A key element of the activation process is the stabilization of the resulting activated complex using non-coordinating anions. For example, halide containing metallocene complexes can be activated using an organoalumoxane such as methylalumoxane (MAO) or isopropylalumoxane. MAO serves as both a methyl alkylating agent and a non-coordinating anion. Other activating components of utility containing boron include silver tetraphenyl borate, triphenylcarbenium tetrakis(pentafluorophenyl) borate, triaryl carbenium tetraarylborates, tris(pentafluorophenyl) boron, N,N-dimethylanilinium tetra(pentafluorophenyl) borate and sodium tetrakis[3,5-bis(trifluoromethyl)-phenyl]borate. Catalyst systems using such activators have been disclosed in U.S. Pat. Nos. 4,808,561; 4,897,455; 4,921,825; 5,191052; 5,198,401; 5,387,568; 5,455,214; 5,461,017; 5,362,824; 5,498,582; 5,561,092; 5,861,352 and publications WO 91/09882; EP0206794B1; EP0507876B1; WO 95/15815; WO 95/23816; EP0563917B1; EP0633272A1; EP0633272B1; EP0675907B1; JP96-113779; EP0677907B1; WO 98/55518; WO 00/04059.

The greatest utility of single-site catalyst systems to the polyolefin industry is realized when they are used in existing gas phase and slurry phase reactors. Inorganic materials such as silica, alumina and magnesium chloride currently have the greatest utility as support materials in the formulation of supported Ziegler-Natta polyolefin catalyst systems. The inorganic supports have also been used with varying degrees of success in supporting metallocene and other types of single-site metal catalysts. A significant limitation of such supports, however, is the presence of surface hydroxyl groups, which render the metallocene catalysts inactive. Large quantities of MAO are used to overcome this effect, with varying degrees of success coupled with the high costs associated using MAO as a support. Polymeric supports, such as cross-linked polystyrene (PS) have been investigated as supports, since they contain no catalyst deactivating or "poisoning" groups. Methods to chemically anchor metallocene and other single-site metal catalysts have also been developed. The most common methods involve tethering the metallocene catalyst through a substituent on the cyclopentadienyl ring, through the boron atom of non-coordinating borate activators, through the nitrogen atom of an ammonium borate salt, through a substituent on the bridge of ansa-metallocene catalysts or through the heteroatom in monocyclopentadienyl complexes. The synthesis of these types of tethered complexes is difficult and generally involves multi-step, costly synthetic procedures. Thus, a general, simple process for the production of polyolefin catalyst systems that provide uniform dispersal of the catalyst, and stabilize the catalyst would, therefore, be of great utility, global economic advantage and strategic value to the commercial manufacture of polyolefins.

SUMMARY OF INVENTION

Accordingly, the present invention provides a novel composition for olefin polymerization. An olefin-based matrix is disclosed, that is hydrozirconated and activated to produce a catalyst system usefully employed for olefin polymerization. In addition, the hydrozirconated matrix may comprise at least one type of activator component or may comprise a combination of catalytic components. The hydrozirconated matrix facilitates production of polyolefins and affords polymer products having improved morphology, as the final polymer product is manufactured in shapes that mimick the shapes of the initial heterogenized catalyst. A general process is disclosed for incorporating a range of zirconium catalysts within the matrix, which have utility in the subsequent production of specific polyolefin products.

It has been discovered that materials containing a plurality of olefin groups react with a variety of zirconium hydride complexes forming a hydrozirconated matrix, which can be activated and usefully employed for the subsequent production of specific polyolefins. The olefin-based materials comprise organic materials having covalently bound olefin groups or inorganic solids functionalized with olefin groups. The organic materials are in the form of solids or liquids and are based on polymers. The olefin-based materials usefully employed for the polymerization of olefins are macroporous organic polymers prepared by dispersion, precipitive, emulsion or suspension polymerization in the presence of porogens. The number of olefin groups, the pore size and surface area in the polymers can be synthetically and morphologically controlled by judicious selection of polymerization conditions. It has been further discovered that the polymers and their resulting hydrozirconated matrices can be prepared in shapes which are useful in the production of polyolefins. Another type of olefin-based materials usefully employed for the polymerization of olefins are inorganic solids and hybrid organic-inorganic polymers, such as siloxanes, that are chemically functionalized with olefin groups. The olefin groups may be disposed on the surface of the materials or may be dispersed throughout the materials. The hydrozirconated matrices can be activated using a variety of boron and alumium containing activators to produce catalyst systems useful in the production of polyolefins.

The single-site metal based catalysts usefully employed in accordance with the present invention are exemplified by, but not limited to, compounds represented by the following formulas:

$[Cp^1Cp^2MR]^+[NCA]^-$ wherein M is a Group 4 metal, $Cp^1$ is a substituted or non-substituted cyclopentadienyl ring and $Cp^2$ is the same or different, substituted or non-substituted cyclopentadienyl ring and may be bridged symmetrically or asymmetrically to $Cp^1$. R is a hydrocarbyl group derived from the hydrozirconation of an olefin-based material. NCA is a non-coordinating anion.

The present invention also provides a general process for the production of specific polyolefins by judicious selection of zirconium complex and olefin-based material. The process comprises polymerizing olefins such as ethylene or propylene alone or in the presence of higher α-olefins, diolefins or cycloolefins in the presence of the matrix described above. Combinations of the above catalysts within the matrix have utility in accordance with process of the present invention.

The advantages of the invention are obtained in the ability of the olefin-based materials to react with a variety of zirconium metallocene complexes, the resulting hydrozirconated matrices having utility in the polymerization of a range of polyolefins. The reaction of the olefin-based materials with the zirconium complex has additional advantages such as stabilizing and supporting the active catalysts.

The advantages of the matrix of the present invention and the scope of its utility in the above mentioned processes are presented in the detailed description of the invention.

DETAILED DESCRIPTION OF THE INVENTION

The present invention is directed to a hydrozirconated matrix for the polymerization of olefins, the matrix formed by reaction of an olefin-based material and a zirconium component. The matrix has utility in a general catalytic process for polymerization of olefins. In particular, the process of catalytically converting ethylene to higher molecular weight polyethylene homopolymers, such as high density polyethylene (HDPE) and linear low density polyethylene (LLDPE), and copolymers with alpha-olefins such as 1-butene, 1-hexene and 1-octene. The polymers are intended for processing into articles of manufacture by extrusion, injection molding, thermoforming, rotational molding, hot melt processing and related techniques. In addition, the polyolefins of the present invention are homopolymers of ethylene and propylene, copolymers of ethylene and propylene with higher alpha-olefins or diolefins, and stereoregular polymers of propylene.

In accordance with the present invention, polyolefins can be prepared from olefin monomers using a matrix in a catalytic process wherein the olefin monomer is selected from the group consisting of unbranched aliphatic olefins having from 2 to 12 carbon atoms, branched aliphatic olefins having from 4 to 12 carbon atoms, unbranched and branched aliphatic α-olefins having from 2 to 12 carbon atoms, conjugated olefins having 4 to 12 carbon atoms, aromatic olefins having from 8 to 20 carbons, unbranched and branched cycloolefins having 3 to 12 carbon atoms, unbranched and branched acetylenes having 2 to 12 carbon atoms, and combinations thereof. Also in accordance with the invention, olefin monomer further comprises polar olefin monomers having from 2 to 60 carbon atoms and at least one atom selected from the group consisting of O, N, B, Al, S, P, Si, F, Cl, Br and combinations thereof.

In particular, the olefin monomer is selected from the group consisting of ethylene, propene, 1-butene, 1-hexene, butadiene, 1,6-hexadiene, styrene, alpha-methylstyrene, cyclopentene, cyclohexene, cyclohexadiene, norbornene, norbornadiene, cyclooctadiene, divinylbenzene, trivinylbenzene, acetylene, diacetylene, alkynylbenzene, dialkynylbenzene, ethylene/1-butene, ethylene/isopropene, ethylene/1-hexene, ethylene/1-octene, ethylene/propene, ethylene/cyclopentene, ethylene/cyclohexene, ethylene/butadiene, ethylene/1,6-hexadiene, ethylene/styrene, ethylene/acetylene, propene/1-butene, propene/styrene, propene/butadiene, propylene/1-hexene, propene/acetylene, ethylene/propene/1-butene, ethylene/propene/1-hexene, ethylene/propene/1-octene, and various combinations thereof.

In one embodiment, the hydrozirconated matrix of the present invention can be usefully employed in ethylene homopolymerization and copolymerization of ethylene/higher α-olefins, allowing the synthesis of ethylene homopolymers and copolymers with narrow molecular weight distributions and/or homogeneous branching distributions. The HDPE and LLDPE resins prepared are intended for use in the processing of films with relatively high impact strength and clarity, the fabrication into articles and useful objects by extrusion, injection molding, thermoforming, rotational molding, holt melt processing, the processing of polyethylenes having monodisperse, inorganic particulate additives or modifiers and the processing of coated surfaces, articles and useful objects using polymers comprising ethylene.

An embodiment illustrative of the general utility of the hydrozirconated matrix is the production of polyethylene. All three classes of the polyethylene (PE), namely high density polyethylene (HDPE), low density polyethylene (LDPE) and linear low density polyethylene (LLDPE), can be prepared using the hydrozirconated matrix of the present invention. HDPE is a linear, semi-crystalline ethylene homopolymer prepared using Ziegler-Natta and Chromium based polymerization methods. LLDPE is a random copolymer of ethylene and α-olefins (such as 1-butene, 1-hexene or 1-octene) prepared commercially using Ziegler-Natta, Chromium based or metallocene based catalysts. LDPE is a branched ethylene homopolymer prepared commercially using a high temperature and high pressure process. HDPE, LDPE and LLDPE can all be prepared by using the hydrozirconated matrix of the present invention.

In the process of the present invention, olefins such as ethylene or propylene either alone or together with higher alpha-olefins, having 3 or more carbons atoms, are polymerized in the presence of an activated, hydrozirconated matrix comprising reacting an olefin-based material and at least one zirconium complex and at least one activating agent.

In accordance with the invention, one can also produce olefin copolymers of ethylene and higher alpha-olefins having 3–20 carbon atoms. Comonomer content can be controlled through selection of the zirconium component and the olefin-based material.

Olefin-Based Materials

The olefin-based materials usefully employed in accordance with the invention comprise organic materials having covalently bound olefin groups and inorganic materials functionalized with olefin groups. The organic materials are in the form of solids or liquids and are preferably polymeric solids. The olefin-based materials usefully employed for the polymerization of olefins are macroporous organic polymers prepared by suspension polymerization in the presence of porogens. The number of olefin groups, the pore size and surface area in the polymers can be synthetically and morphologically controlled by judicious selection of polymerization conditions. It has been further discovered that the polymers and their resulting matrices can be prepared in shapes which are useful in the production of polyolefins. Another type of olefin-based materials usefully employed for the polymerization of olefins are inorganic solids and hybrid organic-inorganic polymers, such as siloxanes, that are chemically functionalized with olefin groups. The olefin groups may be disposed on the surface of the solids or may be dispersed throughout the solids. The olefinic groups can either be introduced synthetically or are residual olefinic groups remaining after polymerization.

An embodiment of an olefin-based material in accordance with the present invention involves introducing olefinic groups into silica or other inorganic oxides by reacting surface hydroxyl groups with olefin-containing chlorosilane compounds such as $(CH_3)_2ClSi(vinyl)$, $(CH_3)_2ClSi(allyl)$, $Cl_3Si(vinyl)$ or $Cl_3Si(allyl)$ or alkoxy silane compounds such as $(OR)_3Si(vinyl)$ or $(OR)_3Si(allyl)$, where R represents an alkyl group. Another embodiment of the invention involves the introduction of olefinic groups into organic polystyrene (PS) copolymers by using chloromethylation followed by conversion into phosphonium salts and finally into vinyl groups by Wittig vinylation. Other methods to introduce olefinic groups into organic polymers are disclosed in publications by Darling et al., such as React. Funct. Polym. 1998, 36(1), 1–16, the contents and reference citations of which may be usefully employed in accordance with the invention.

A further embodiment directed to olefin-based materials of the present invention concerns using olefinic moities in inorganic polymers that result from the condensation polymerization of organosilanes and siloxanes containing vinyl (olefinic) functional groups such as as $(OR)_3Si(vinyl)$ or $(OR)_3Si(allyl)$. Condensation polymerizations of organosiloxane materials to produce porous, spherical beads are disclosed in publications of Unger et al., such as J. Chromatogr. 1976, 125, 115 and may be usefully employed in accordance with the invention. Yet another embodiment within the scope of the present invention concerns using olefinic moities in organic polymers that result from the polymerization of diolefin monomers in which one olefin group selectively polymerizes. Polydiene polymers, such as polybutadiene and polyisoprene, and copolymers of butadiene and styrene and/or divinylbenzene are examples of polymers containing residual unreacted, pendant vinyl (olefinic) groups that have utility as olefinic materials for the metallocene catalysts of the present invention. Other examples of olefin containing materials are disclosed in publications by Darling et al., such as React. Funct. Polym.1998, 36(1), 1–16, the contents and reference citations of which may be usefully employed in accordance with the invention.

According to the most preferred embodiment for the olefin-based material in the present invention, olefin containing polymers are prepared from suspension, precipitive or emulsion polymerization of commercial grade divinylbenzene (DVB). An unexpected advantage of the invention was discovered in observations made when varying the conditions of the polymerization, the amount of residual pendant vinyl groups can be synthetically and morphologically controlled. The olefin containing polymers produced by the suspension, precipitive, dispersion or emulsion polymerization of DVB are crosslinked and thus insoluble, have spherical structures and can be produced at particle sizes between 2 nm and 1000 microns. In addition, the olefin containing polymers can be made porous by addition of a non-solvent during the polymerization, further enhancing their utility as a ligand system for the catalyst matrix of the present invention. The amount of porosity, pore diameter and surface area can be controlled by varying the amount and type of non-solvent used during the polymerization as disclosed in publications of Meitzner et. al., such as those related to U.S. Pat. No. 4,382,124, the contents of which are usefully employed in accordance with the invention. As used herein, the term "olefin containing organic material" indicates a polymer or copolymer polymerized from a monomer or mixture of monomers containing at least 4 weight percent (%), based on the total monomer weight, of polyvinyl unsaturated monomer. The olefin containing organic material useful in the preparation of the catalyst matrix of the present invention are preferably polymerized from monomer mixtures containing at least 2% by weight polyvinyl aromatic monomers and more preferably greater than 20% polyvinylaromatic monomers.

Olefin containing organic material useful in the preparation of the catalyst matrix of the present invention are preferably spherical copolymer beads having particle diameters from 2 nanometers to 2 millimeters (mm), such as are produced by emulsion, dispersion, precipitive or suspension polymerization, and preferably possess a surface area greater than 1 $m^2/g$, preferably greater than 10 $m^2/g$ and more preferably greater than 100 $m^2/g$. Although any olefin containing material containing at least 0.01 mmol/g of residual vinyl groups and at least 2% polyvinylaromatic monomer units may be used as part of the catalyst matrix of the present invention, the preferred olefin containing organic materials are macroporous polymer beads of the type described in U.S. Pat. No. 4,382,124, in which porosity is introduced into the copolymer beads by suspension-polymerization in the presence of a porogen (also known as "phase extender" or "precipitant"), that is, a solvent for the monomer but a non-solvent for the polymer.

A typical macroporous polymer bead preparation, for example, may include preparation of a continuous aqueous phase solution containing suspension aids (such as dispersants, protective colloids and buffers) followed by mixing with a monomer mixture containing 2 to 100% polyvinylaromatic monomer, free-radical initiator and 0.2 to 5 parts porogen (such as toluene, xylenes, $(C_4–C_{10})$-alkanols, ($C_6$–$C_{12}$)-saturated hydrocarbons or polyalkylene glycols) per one part monomer. The mixture of monomers and porogen is then polymerized at elevated temperature and the porogen is subsequently removed from the resulting polymer beads by various means; for example, toluene, xylene and ($C_4$–$C_{10}$) alcohols may be removed by distillation or solvent washing, and polyalkylene glycols by water washing. The resulting macroporous copolymer is then isolated by conventional means, such as dewatering followed by drying.

Suitable polyvinylaromatic monomers that may be used in the preparation of the macroporous copolymers useful in the process of the present invention include, for example, one or more monomer selected from the group consisting of divinylbenzene, 1,3,5-trivinylbenzene, divinyltoluene, divinylnaphthalene, and divinylxylene; it is understood that any of the various positional isomers of each of the aforementioned crosslinkers is suitable; preferably the polyvinylaromatic monomer is divinylbenzene. Preferably the macroporous copolymer comprises 2 to 100%, and more preferably 10 to 80%, polyvinyl aromatic monomer units.

Optionally, aliphatic crosslinking monomers, such as ethyleneglycol diacrylate, ethyleneglycol dimethacrylate, vinyl cyclohexene, butadiene, trimethylolpropane triacrylate, trimethylolpropane trimethacrylate, diethyleneglycol divinyl ether and trivinylcyclohexane, may also be used in addition to the polyvinylaromatic crosslinker.

Suitable monounsaturated vinylaromatic monomers that may be used in the preparation of the macroporous polymers useful in the process of the present invention include, for example, styrene, α-methylstyrene, ($C_1$–$C_4$)alkyl-substituted styrenes and vinylnaphthalene; preferably one or more monounsaturated vinylaromatic monomer is selected from the group consisting of styrene, halogen substituted styrenes and ($C_1$–$C_4$)alkyl-substituted styrenes. Included among the suitable ($C_1$–$C_4$)alkyl-substituted styrenes are, for example, ethylvinylbenzenes, vinyltoluenes, diethylstyrenes, ethylmethylstyrenes and dimethylstyrenes; it is understood that any of the various positional isomers of each of the aforementioned vinylaromatic monomers is suitable. Preferably the macroporous polymer comprises zero to 98%, and more preferably 20 to 90%, monounsaturated vinylaromatic monomer units.

Optionally, non-aromatic vinyl monomers, such as aliphatic unsaturated monomers, for example, vinyl chloride, acrylonitrile, (meth)acrylic acids and alkyl esters of (meth) acrylic acids may also be used in addition to the vinylaromatic monomer. When used, the non-aromatic vinyl monomers typically comprise as polymerized units, from zero to 20%, preferably from zero to 10%, and more preferably from zero to 5% of the macroporous copolymer, based on the total monomer weight used to form the macroporous polymer.

Suitable macroporous polymers useful as materials for the preparation of the catalyst matrix of the present invention are any macroporous polymers containing some "free" vinyl (olefin) groups. These vinyl groups are residual vinyl groups that were left unreacted (representing less than 100% efficiency of the diolefin crosslinker) during the polymerization process used to prepare the macroporous copolymer substrate. Suitable macroporous copolymer substrates comprise greater than 2 weight percent polyvinylaromatic monomer units and have at least 0.01, preferably from 0.1 to 5, and more preferably from 0.1 to 4 mmol/g residual vinyl groups.

Alternative polymerization technologies to produce vinyl (olefinic) containing polymers and copolymers useful in this present invention include but are not limited to emulsion polymerization, solution polymerization, precipitation polymerization, dispersion polymerization, anionic polymerization, seeded polymerization, and condensation polymerizations. Essentially any olefinic, diolefinic or multiolefinic monomer can usefully comprise the catalyst matrix of the present invention. Non limiting examples of olefin containing functional groups include vinyl, allyl, alkenyl and alkynyl radicals.

Several methods were used to characterize and quantify the amount of olefinic groups contained in the organic and inorganic materials useful in the present invention. These include the use of solid state $^{13}$C NMR (nuclear magnetic resonance) CP/MAS-TOSS (cross polarization magic angle spinning with total sideband suppression) and infrared spectroscopy. Chemical derivatization of olefin groups is yet another method used to quantify the amount of olefinic groups contained in a material. The use of a variety of characterization techniques to quantify the amount of pendent vinyl groups contained in a polydivinylbenzene polymer is disclosed in publications of Law et al., such as Macromolecules 1997, 30, 2868–275 and Hubbard et al., React. Funct. Polym, Vol. 36 (1), pages 17–30 (1998), which may be usefully employed in accordance with the invention.

Zirconium Component

The component usefully employed in accordance with the invention are organometallic compositions of zirconium containing at least one hydride ligand.

Illustrative, but not limiting examples of organometallic zirconium compounds which may be used in the preparation of the hydrozirconated matrix of the present invention are listed below:
dihydrido-substituted bis (cyclopentadienyl) zirconium compounds such as
bis(cyclopentadienyl)zirconium dihydride
bis(pentamethylcyclopentadienyl)zirconium dihydride
bis(methylcyclopentadienyl)zirconium dihydride
bis(n-butylcyclopentadienyl)zirconium dihydride
bis(indenyl)zirconium dihydride
bis(1-fluorenyl)zirconium dihydride
and chemically/structurally related compounds;
hydrido halide-substituted bis(cyclopentadienyl)zirconium compounds such as
bis(cyclopentadienyl)zirconium hydrido chloride
bis(pentamethylcyclopentadienyl)zirconium hydrido chloride
bis(methylcyclopentadienyl)zirconium hydrido chloride
bis(n-butylcyclopentadienyl)zirconium hydrido chloride
bis(indenyl)zirconium hydrido chloride
bis(fluorenyl)zirconium dihydrido chloride
and chemically/structurally related compounds;
hydrocarbyl hydride-substituted bis(cyclopentadienyl)zirconium compounds such as
bis(cyclopentadienyl)zirconium methyl hydride
bis(pentamethylcyclopentadienyl)zirconium methyl hydride
bis(methylcyclopentadienyl)zirconium methyl hydride
bis(n-butylcyclopentadienyl)zirconium methyl hydride bis(pentamethylcyclopentadienyl)zirconium (phenyl)(hydride),
bis(pentamethylcyclopentadienyl)zirconium (methyl)(hydride)
bis(indenyl) zirconium methyl hydride
bis(1-fluorenyl)zirconium methyl hydride
and chemically/structurally related compounds;
(bridged-cyclopentadienyl)zirconium compounds such as
methylene bis(cyclopentadienyl)zirconium methyl hydride
methylene bis(cyclopentadienyl)zirconium hydrido chloride
methylene bis(cyclopentadienyl)zirconium dihydride,
ethylene bis(cyclopentadienyl)zirconium methyl hydride,
ethylene bis(cyclopentadienyl)zirconium hydrido chloride
dimethylsilyl bis(cyclopentadienyl)zirconium methyl hydride,
ethylene bis(cyclopentadienyl)zirconium dihydride
dimethylsilyl bis(cyclopentadienyl)zirconium dihydride
and chemically/structurally related compounds;
chiral and $C_2$-symmetry compounds; asymetrically bridged metallocene compounds such as
methylene(cyclopentadienyl)(1-fluorenyl)zirconium methyl hydride,
dimethysilyl(cyclopentadienyl)(1-fluorenyl)zirconium dihydride,
isopropyl(cyclopentadienyl)(1-fluorenyl)zirconium methyl hydride,
isopropyl(cyclopentadienyl)(1-octahydrofluorenyl)zirconium methyl hydride,
dimethylsilyl(methylcyclopentadienyl)(1-fluorenyl)zirconium dihydride,
methylene(cyclopentadienyl)(tetramethylcyclopentadienyl) zirconium methyl hydride
methylene(cyclopentadienyl)(tetramethylcyclopentadienyl) zirconium dihydride
and chemically/structurally related compounds;
racemic and meso isomers of symmetrically bridged metallocene compounds such as
ethylenebis(indenyl)zirconium dihydride,
ethylenebis(indenyl)zirconium hydrido chloride
ethylenebis(indenyl)zirconium methyl hydride
dimethylsilylbis(indenyl)zirconium methyl hydride
dimethylsilylbis(indenyl)zirconium dihydride
dimethylsilylbis(indenyl)zirconium hydrido chloride
ethylenebis(tetrahydroindenyl)zirconium dihydride
ethylenebis(tetrahydroindenyl)zirconium methyl hydride
ethylenebis(tetrahydroindenyl)zirconium hydrido chloride
dimethylsilylbis(3-trimethylsilylcyclopentadientyl)zirconium dihydride
dimethylsilylbis(3-trimethylsilylcyclopentadientyl)zirconium methyl hydride
and the like;

Illustrative, but not limiting examples of zirconium metallocene compounds that usefully comprise the catalyst matrix of the present invention are disclosed in publications of Alt and Koeppl, such as Chem. Rev., 100, 1205–1222, 2000, Bercaw, Organometallics, 18, 1873–1881, 1999, and Hlatky, Chem. Rev., 100, 1347–1376, 2000, the contents of which are usefully employed in accordance with the invention. Chemically and structurally related zirconium compounds that are useful in the catalyst matrix of the present invention would be apparent to those skilled in the art based on their respective chemical structures and reactivities in olefin polymerizations.

Activator Components

Illustrative, but not limiting examples of activators that usefully comprise the catalyst matrix of the present invention are disclosed in publications of Chen and Marks, such as Chem. Rev., 100, 1391–1434, 2000, Coates, such as Chem. Rev., 100, 1223–1252, 2000, Resconi et al., such as Chem. Rev., 100, 1253–1346, 2000, Fink et al., such as Chem. Rev., 100, 1377–1390, 2000, Alt and Koeppl, such as Chem. Rev., 100, 1205–1222, 2000 and Hlatky, Chem. Rev., 100, 1347–1376, 2000, the contents of which are usefully employed in accordance with the invention.

Activators usefully comprising the catalyst matrix of the present invention are:

Boron containing activators derived from organic or inorganic borane compounds or borate anions, aluminum compounds derived from aluminum alkyls, organoaluminoxanes (e.g. MAO). Preferred examples of activators employed in the catalyst matrix of the present invention are trifluoroborane, triphenylborane, Tris(4-fluoro-phenyl)borane, Tris(3,5-difluorophenyl)borane, Tris(4-fluoromethylphenyl)borane, Tris(pentafluorophenyl)borane, Tris(tolyl)borane, Tris(3,5-dimethylphenyl)borane, Tris (3,5-difluorophenyl)borane, Tris(3,4,5-trifluorophenyl) borane, Dimethylanilinium tetra(pentafluorophenyl) borate, sodium $[B\{3,5-(CF_3)_2C_6F_3\}_4]$, $[H(OEt_2)_1[B\{3,5-(CF_3)_2C_6F_3\}_4]$, aluminum alkyls such as $Al(C_2H_5)_3$, $Al(CH_2CH(CH_3)_2)_3$, $Al(C_3H_7)_3$, $Al((CH_2)_3CH_3)_3$, $Al((CH_2)_5CH_3)_3$, $Al(C_6F_5)_3$, $Al(C_2H_5)_2Cl_1$, $Al_2(C_2H_5)_3Cl_2$, $AlCl_3$ and aluminoxanes such as methylaluminoxane (MAO), modified methyl aluminoxane (MMAO), isobutylaluminoxane, butylaluminoxane, heptylaluminoxane and methylbutylaluminoxane. Both stoichiometric and non-stoichiometric quantities of activators are usefully employed in the catalyst matrix of the present invention using triaryl carbenium tetraarylborates, N,N-dialkylanilinium salts such as N,N-dimethylanilinium tetrakis (pentafluorophenyl)borate, N,N-diethylanilinium tetra (phenyl)borate, N,N-2,4,6-pentamethylanilinium tetraphenylborate and chemically related Group 13 compounds; dialkyl ammonium salts such as di(i-propyl) ammonium tetrakis(pentafluorophenyl)borate, dicyclohexylammonium tetra(phenyl)boron and chemically related Group 13 compounds; triaryl phosphonium salts such as triphenylphosphonium tetraphenylborate, tri(methylphenyl)phosphonium tetra(phenyl)borate, tri(dimethylphenyl)phosphonium tetra(phenyl)borate and chemically related Group 13 compounds. Any complex anions or compounds forming such anions that exhibit an ability to abstract and activate the metal compounds would be within the scope of the catalyst matrix of the present invention. Chemically and structurally related boron compounds and aluminum compounds as well as other catalysts of Group 13 elements that are useful in the catalyst matrix of the present invention would be apparent to those skilled in the art based on their respective chemical structures and activities in olefin polymerizations.

Catalytic Matrix

The catalytic matrix of the present invention is formed by reacting a zirconium component with the olefin containing material. The reaction of bis(cyclopentadienyl) zirconium hydrido chloride with olefins was first reported by Schwartz et al. in J. Am. Chem. Soc. 1974, 96, 8115. Subsequently, the reaction of bis(cyclopentadienyl)zirconium hydride compounds with olefins has become known by those skilled in the art as a hydrozirconation reaction. Herein, we disclose the use of a hydrozirconation reaction to bind a metallocene complex to an olefin based material to produce a hydrozirconated matrix. The hydrozirconated matrix is activated using conventional boron or aluminum containing activators to produce the catalytic matrix of the present invention that is useful for the production of polyolefins.

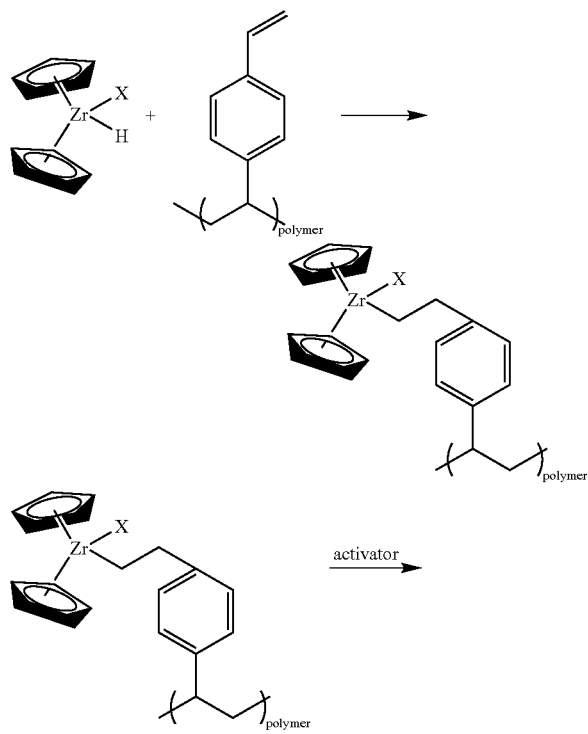

X = halide, alkyl, hydride

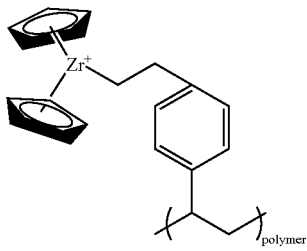

Evidence for the formation of the hydrozirconated catalytic matrix can be obtained using solid state $^{13}C$ NMR or IR spectroscopy in which a substantial reduction in olefin resonance is observed. Elemental analysis and techniques to determine elemental composition such as TOF-SIMS and ESCA can also be used to analyzed the catalyst matrix of the present invention.

Polyolefin Processes

Reactor systems well known in the art, such gas phase reactors, slurry loop reactors and solution phase reactors or combinations of reactors can be usefully employed in accordance with the present invention for polyolefin production using the catalytic matrices described above. Gas phase or slurry loop polymerization reactors are preferred.

In a separate embodiment, a catalytic matrix is deposited on a subtrate which comprises an organic or inorganic material. The material may be in the form of an object or particulate or comprise the surface of a material. The material is subsequently exposed to olefin monomer to form a polyolefin coating on the material. A coating process comprising depositing the catalytic matrix of the present invention on a substrate and polymerizing olefin monomer to produce a polyolefin coated surface, object or particulate can be usefully employed in accordance with the invention. The substrate may comprise an organic polymer or may consist of an inorganic oxide, comprising clays, micas, silicates, metals and non-metal oxides. In another embodiment, a process for preparing a composite of substrate and polyolefin in-situ using the matrix of claim 1 in combination with at least one substrate can be employed in accordance with the invention.

The modification of polyolefin properties in-situ is an important advantage of the catalytic matrices of the present invention. Modification of the properties of polyolefins such as polyethylene and polypropylene are possible using matrices of the invention. The ability of the matrix to be used as a polymer modifier in-situ is a key advantage of the invention as compared to the manner of modifying polymer properties known currently in the art. Mechanical properties, such as resistance to shear and impact forces, rheological properties, such as glass transition temperature or viscosity and other physical properties such as fire retardancy of polyolefins can be modified in specific polyolefins in accordance with the invention. In one embodiment, a process for the production of hydrophobically modified particles as hydrophobically modified inorganic particles can be usefully employed in accordance with the invention. The particles can be in the form of spheres, surfaces and objects in which the catalyst matrix is deposited on the particles and polymerized in the presence of an olefin. Other variations of preparing polyolefin coated objects or modified polyolefins are within the scope of the present invention.

EXPERIMENTAL EXAMPLES

In the following examples, all reagents used are of good commercial quality, unless otherwise indicated, and all percentages and ratios given herein are by weight unless otherwise indicated.

Example 1

An example illustrating the preparation of an organic material containing olefinic groups useful for the preparation of the catalyst matrix of the present invention.

A 2-liter, 4-necked flask was equipped with a condenser, mechanical stirrer, thermocouple and nitrogen inlet, containing an aqueous solution prepared by mixing together 680 g deionized water, 3.4 g methylhydroxyethylcellulose, 0.04 g sodium lauryl sulfate, 2.5 g 50% aqueous sodium hydroxide solution and 2.7 g boric acid. A monomer mixture containing 182 g divinylbenzene (80% purity) 149 g xylene, 179 g methylisobutylcarbinol and 4.5 g benzoyl peroxide was added to the mixture. Under a nitrogen atmosphere, the resulting mixture was stirred at 300 rpm to maintain the monomer in discrete droplets and heated to 75° C. over a 1-hour period. The monomers were allowed to polymerize at 75° C. for 10 hours. Xylene and MIBC were removed from the mixture by washing with methanol and the resulting polymer beads were allowed to dry overnight in an oven at 40° C. The olefin containing polymer product had an average particle diameter of 80 microns, a porosity of 1.9 cc/g, a 4 V/A pore diameter of 104 angstroms and a surface area of 730 $m^2/g$. The amount of pendant vinyl groups, as determined by $^{13}CNMR$ was measured to be approximately 1.8 mmol/g.

Example 2

An example illustrating the preparation of an inorganic material functionalized with olefinic groups useful for the preparation of the catalyst matrix of the present invention. In an argon filled glove box, 0.58 g of Grace Davison 948 silica that had been activated at 200° C. for 2 hours, was mixed with 2 grams of dimethylchlorovinyl silane. This mixture was placed into a glass reactor and sealed and removed from the box. After heating for 3 days the reactor was opened inside of the glove box and the contents filtered and the product washed with 20 ml of toluene and then washed with 2×20 ml of heptane. 0.50 g of product was recovered. Elemental analysis and infared spectroscopy indicated that the product contained 0.9 mmol/g of vinyl groups.

Example 3

Catalytic Matrix A

An example illustrating the preparation of hydrozirconated matrix and activation using MAO to comprise a catalytic matrix of the present invention useful for the polymerization and copolymerization of ethylene.

All manipulations were performed in a glove box under a dry and inert, argon atmosphere.

To 0.100 g of the olefinic material from Example 1 was added 5 ml of toluene. The material was allowed to swell in toluene for 30 minutes. Next, 0.010 g of bis(cyclopentadienyl) zirconium hydrido chloride (Schwartz' reagent) was added to the toluene swollen olefin containing material. This mixture was allowed to mix together for 23 hours resulting in a colorless solution and an orange insoluble product. The material was filtered and washed with 10 ml of toluene followed by 2×20 ml of dry oxygen free heptane. The orange brown product was dried under vacuum yielding 0.100 g of hydrozirconated matrix. This product contained 0.35 mmol of Zr per gram.

To 0.100 g of hydrozirconated matrix was added 12.85 mL of a 10% MAO solution in toluene. This mixture was allowed to mix for 24 hours and then was filtered and washed with 10 ml of toluene followed by 20 ml of dry oxygen free heptane to give 0.090 g of a beige catalyst matrix with a 0.028 mmol Zr/g loading level and a 500:1 Al to Zr ratio.

Example 4

Catalytic Matrix B

An example illustrating the preparation of hydrozirconated matrix and activation using $(C_6H_5)_3C^+B(C_6F_5)_4^-$ to comprise a catalytic matrix of the present invention useful for the polymerization and copolymerization of ethylene.

All manipulations were performed in a glove box under a dry and inert, argon atmosphere.

To 0.100 g of the olefinic material from Example 1 was added 5 ml of toluene. The material was allowed to swell in toluene for 30 minutes. Next, 0.030 g of bis(cyclopentadienyl) zirconium hydrido chloride (Schwartz' reagent) was added to the toluene swollen olefin containing material. This mixture was allowed to mix together for 36 hours resulting in a colorless solution and an orange insoluble product. The material was filtered and washed with 10 ml of toluene followed by 2×20 ml of dry oxygen free heptane. The orange brown product was dried under vacuum yielding 0.100 g of hydrozirconated matrix. This product contained 1.0 mmol of Zr per gram.

To 0.062 g of hydrozirconated matrix in 5 ml of toluene was added 0.114 g of $(C_6H_5)_3C^+B(C_6F_5)_4^-$ in toluene. This mixture was allowed to stir for 1 hour and then was filtered and washed with 5×15 ml of toluene followed by 3×15 ml of dry oxygen free heptane to give 0.066 g of a pale orange catalytic matrix with a 0.60 mmol/g Zr loading level.

Example 5

Catalytic Matrix C

An example illustrating the preparation of a hydrozirconated matrix and activation using $(C_6H_5)_3C^+B(C_6F_5)_4^-$ to comprise a catalytic matrix of the present invention useful for the polymerization and copolymerization of ethylene.

All manipulations were performed in a glove box under a dry and inert, argon atmosphere.

To 0.480 g of the olefinic material from Example 1 was added 10 ml of toluene. The material was allowed to swell in toluene for 30 minutes. Next, 0.020 g of bis(cyclopentadienyl) zirconium methyl hydride dimer was added to the toluene swollen olefin containing material. This mixture was allowed to mix together for 2.5 hours resulting in a colorless solution and an orange insoluble product. The material was filtered and washed with 2×20 ml of toluene followed by 2×20 ml of dry oxygen free heptane. The orange brown product was dried under vacuum yielding 0.400 g of hydrozirconated matrix. This product was found to contain 0.56 mmol of Zr per gram.

To 0.100 g of the hydrozirconated matrix was added 0.100 g of $(C_6H_5)_3C^+B(C_6F_5)_4^-$ in 10 ml of toluene. This mixture was allowed to stir for 2.5 hours and then was filtered and washed with 3×30 ml of toluene followed by 2×20 ml of heptane to give 0.090 g of a brown orange catalytic matrix that was found to contain 0.18 mmol of Zr.

Example 6

Catalytic Matrix D

An example illustrating the preparation of a hydrozirconated matrix and activation using $B(C_6F_5)_3$ to comprise a catalytic matrix of the present invention useful for the polymerization and copolymerization of ethylene.

All manipulations were performed in a glove box under a dry and inert, argon atmosphere.

To 0.100 g of the hydrozirconated matrix from Example 5 was added 0.080 g of $B(C_6F_5)_3$ in 5 ml of toluene. This mixture was allowed to stir for 3 hours and then was filtered and washed with 2×20 ml of toluene followed by 2×20 ml of dry oxygen free heptane to give 0.070 g of a beige catalytic matrix that was found to contain 0.31 mmol of Zr.

Example 7

Ethylene Homopolymerization

An example illustrating the polymerization of ethylene using a specific catalyst matrix of the present invention.

Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.050 g of catalyst matrix A were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The spherical, free flowing polyethylene produced had a melting point (DSC-10 C/min) of 135° C.

Example 8

Ethylene Homopolymerization

An example illustrating the polymerization of ethylene using a specific catalyst matrix of the present invention.

Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.041 g of catalyst matrix B were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The spherical, free flowing polyethylene produced had a melting point (DSC-10 C/min) of 136.2° C., a Mn of 78,600, a Mw of 363,300 and a MWD of 4.62.

Example 9

Ethylene Homopolymerization

An example illustrating the polymerization of ethylene using a specific catalyst matrix of the present invention.

Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.050 g of catalyst matrix C were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The spherical, free flowing polyethylene produced had a melting point (DSC-10 C/min) of 137.4° C., a Mn of 86,600, a Mw of 405,000 and a MWD of 4.90.

Example 10

Ethylene Homopolymerization

An example illustrating the polymerization of ethylene using a specific catalyst matrix of the present invention.

Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.049 g of catalyst matrix D were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The spherical, free flowing polyethylene produced had a melting point (DSC-10 C/min) of 139.3° C., a Mn of 125,200, a Mw of 541,400 and a MWD of 4.32.

Example 11

An example illustrating the preparation of a hydrozirconated matrix and activation using MAO to comprise a catalytic matrix of the present invention useful for the polymerization and copolymerization of ethylene.

All manipulations were performed in a glove box under a dry and inert, argon atmosphere.

The hydrozirconated matrix was formed by reacting a toluene solution containing 0.024 g of Kraton D1102 (a styrene/butadiene copolymer containing pendant olefin groups from 1,2 addition) with a toluene solution containing 0.0016 g of bis(cyclopentadienyl)zirconium hydrido chloride (Schwartz' reagent). After mixing the two colorless solutions together for 24 hours, a golden yellow solution formed.

The polymerization was performed in the solution phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger, the toluene solution of the hydrozirconated Kraton and 0.31 mL of a 10% toluene solution of MAO were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The granular, free flowing polyethylene produced had a melting point (DSC-10 C/min) of 133.3° C., a Mn of 38,000, a Mw of 207,600 and a MWD of 5.46.

Example 12

An example illustrating the preparation of a hydrozirconated matrix and activation using MAO to comprise a catalytic matrix of the present invention useful for the polymerization and copolymerization of ethylene.

All manipulations were performed in a glove box under a dry and inert, argon atmosphere.

To 0.024 g of a dry, 20 micron polydivinylbenzene particle containing 0.5 mol/g of pendant vinyl group produced by the emulsion polymerization of 55% divinylbenzene was added 1 ml of toluene. The material was allowed to swell in toluene for 30 minutes. Next, 0.0016 g of bis(cyclopentadienyl)zirconium hydrido chloride (Schwartz' reagent) was added to the toluene swollen olefin containing material. This mixture was allowed to mix together for 24 hours resulting in a pale yellow suspension The polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger, the toluene solution of the hydrozirconated polydivinylbenzene emulsion polymer and 0.31 mL of a 10% toluene solution of MAO were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The granular, free flowing polyethylene produced had a melting point (DSC-10 C/min) of 139.3° C., a Mn of 70,600, a Mw of 312,100 and a MWD of 4.42.

We claim:

1. A porous particulate composition comprising a hydrozirconated matrix further comprising at least one zirconium component and at least one polymer having a plurality of olefin groups wherein the zirconium component is chemically bonded to the matrix through hydrocarbon groups derived from reacting at least one zirconium compound with covalently bound olefin groups of the polymer.

2. The composition of claim 1, wherein the olefin groups are selected from the group consisting of vinyl, allyl, alkenyl, alkynyl, conjugated olefin groups, olefin groups having polar substituents and combinations thereof.

3. The composition of claim 1, wherein the polymer having a plurality of olefin groups is selected from the group consisting of divinylbenzene polymers, divinylbenzene copolymers, styrene/divinylbenzene copolymers, divinylbenzene resins, cross-linked divinylbenzene polymers, cross-linked butadiene polymers, styrene/butadiene copolymers, styrene/isoprene copolymers, vinylsiloxane polymers, and vinylsiloxane copolymers.

4. The composition of claim 3, wherein polymers having a plurality of olefin groups are formed in the presence of porogens.

5. The composition of claim 1, wherein a plurality of olefin groups are disposed on surfaces of organic materials and one or more polymers.

6. The composition of claim 3, wherein the polymer having a plurality of olefin groups is a macroporous polymeric material prepared from a suspension polymer.

7. The composition of claim 6, wherein the macroporous polymer is prepared from divinylbenzene.

8. The composition of claim 1, wherein the polymer having a plurality of olefin groups is a vinylsiloxane.

9. The composition of claim 1, wherein the zirconium component is an organozirconium compound capable of undergoing a hydrozirconation reaction.

10. The composition of claim 9, wherein the organozirconium compound is selected from the group consisting of bis (cyclopentadienyl)zirconium dihydride, bis (pentamethylcyclopentadienyl) zirconium dihydride, bis (methylcyclopentadienyl) zirconium dihydride, bis (N-butylcyclopentadienyl) zirconium dihydride, bis (indenyl) zirconium dihydride, bis (1-fluorenyl) zirconium dihydride, bis (cyclopentadienyl) zirconium hydride chloride, bis (pentamethylcyclopentadienyl) zirconium hydrido chloride, bis (methylcyclopentadienyl) zirconium hydride chloride, bis (n-butylcyclopentadienyl) zirconium hydrido chloride, bis (indenyl) zirconium hydrido chloride, bis (fluorenyl) zirconium dihydrido chloride, bis (cyclopentadienyl)zirconium methyl hydride, bis (pentamethylcyclopentadienyl) zirconium methyl hydride, bis (methylcyclopentadienyl) zirconium methyl hydride, bis (n-butylcyclopentadienyl) zirconium methyl hydride, bis (pentamethylcyclopentadienyl) zirconium (phenyl)(hydride), bis (pentamethylcyclopentadienyl) zirconium (methyl)(hydride), bis (indenyl) zirconium methyl hydride, bis (1-fluorenyl) zirconium methyl hydride, methylene bis(cyclopentadienyl) zirconium methyl hydride, methylene bis (cyclopentadienyl) zirconium hydrido chloride, methylene bis(cyclopentadienyl) zirconium dihydride, ethylene bis(cyclopentadienyl) zirconium methyl hydride, ethylene bis(cyclopentadienyl) zirconium hydrido chloride, dimethylsilyl bis(cyclopentadienyl) zirconium methyl hydride, ethylene bis(cyclopentadienyl) zirconium dihydride, dimethylsilyl bis(cyclopentadienyl) zirconium dihydride, methylene(cyclopentadienyl) (1-fluorenyl) zirconium methyl hydride, dimethysilyl(cyclopentadienyl) (1-fluorenyl) zirconium dihydride, isopropyl(cyclopentadienyl)(1-fluorenyl) zirconium methyl hydride, isopropyl(cyclopentadienyl) (1-octahydrofluorenyl) zirconium methyl hydride, dimethylsilyl (methylcyclopentadienyl) (1-fluorenyl) zirconium dihydride, methylene(cyclopentadienyl) (tetramethylcyclopentadienyl) zirconium methyl hydride, methylene(cyclopentadienyl) (tetramethylcyclopentadienyl) zirconium dihydride, ethylenebis(indenyl)zirconium dihydride, ethylenebis (indenyl)zirconium hydrido chloride, ethylenebis(indenyl) zirconiummethylhydride, dimethylsilylbis(indenyl) zirconium methylhydride, dimethylsilylbis(indenyl)zirconium dihydride, dimethylsilylbis(indenyl)zirconium hydridochloride, ethylenebis(tetrahydroindenlyl) zirconium dihydride, ethylenebis(tetrahydroindenyl)zirconium methyl hydride, ethylenebis(tetrahydroindenyl)zirconium hydrido chloride, dimethylsilylbis(3-trimethylsilylcyclopentadientyl)zirconium dihydride, dimethylsilylbis(3-trimethylsilylcyclopentadientyl)zirconium methyl hydride, chemically and structurally related zirconium compounds and combinations thereof.

11. A porous particulate catalyst composition comprising a hydrozirconated matrix further comprising at least one zirconium component and at least one polymer having a plurality of olefin groups wherein the zirconium component is chemically bonded to the matrix through hydrocarbon groups derived from reacting at least one zirconium compound with covalently bound olefin groups of the polymer and at least one activator component.

12. A catalytic composition of claim 11, wherein the hydrozirconated matrix further comprises a plurality of catalytic components.

13. The catalyst composition of claim 11, wherein at least one activator component is selected from the group consisting of: alumoxanes, alkylalumoxanes, methylaluminoxane (MAO), modified methyl aluminoxane (MMAO), isobutylaluminoxane, butylaluminoxane, heptylaluminoxane and methylbutylaluminoxane, aluminum alkyls, $Al(C_2H_5)_3$, $Al(CH_2CH(CH_3)_2)_3$, $Al(C_3H_7)_3$, $Al((CH_2)_3CH_3)_3$, Al((CH$_2$)$_5$ CH$_3$)$_3$, Al(C$_6$F$_5$)$_3$, Al(C$_2$H$_5$)$_2$Cl$_1$, Al$_2$(C$_2$H$_5$)$_3$Cl$_2$, AlCl$_3$, boranes, organoboranes, trifluoroborane, triphenylborane, Tris(4-fluoro-phenyl)borane, Tris(3,5-difluorophenyl)borane, Tris(4-fluoromethylphenyl)borane, Tris (pentafluorophenyl)borane, Tris(tolyl)borane, Tris(3,5-dimethylphenyl)borane, Tris(3,5-difluorophenyl)borane, Tris(3,4,5trifluorophenyl)borane, borates, organoborates, dimethylanilinium tetra(pentafluorophenyl) borate, sodium [B {3, 5-(CF$_3$)$_2$C$_6$F$_3$}$_4$], [H (OEt$_2$)$_1$ [B {3, 5-(CF$_3$)$_2$C$_6$F$_3$}$_4$], triaryl carbenium tetraarylborates, N,N-dialkylanilinium borate salts, N,N-dimethylanilinium tetrakis(pentafluorophenyl)borate, N,N-diethylanilinium tetra(phenyl)borate, N,N-2,4,6-pentamethylanilinium tetraphenylborate, chemically related Group 13 compounds, dialkyl ammonium salts, di(i-propyl)ammonium tetrakis(pentafluorophenyl)borate, dicyclohexylammonium tetra(phenyl)boron, chemically related Group 13 anions, triaryl phosphonium borate salts, triphenylphosphonium tetraphenylborate, tri(methylphenyl)phosphonium tetra(phenyl)borate, tri(dimethylphenyl)phosphonium tetra(phenyl)borate, chemically related non-coordinating anions, and combinations thereof.

14. The catalyst composition of claim 11, wherein the hydrozirconated matrix is represented by a formula [Cp$^1$Cp$^2$MR]$^+$[NCA]$^-$, wherein M is zirconium, Cp$^1$ is a substituted or non-substituted cyclopentadienyl ring and Cp$^2$ is the same or different, substituted or non-substituted cyclopentadienyl ring and may be bridged symmetrically or asymmetrically to Cp$^1$, R is a hydrocarbyl group derived from the hydrozirconation of the polymer having a plurality of olefin groups and NCA is a non-coordinating anion selected from the group consisting of: dimethylanilinium tetra(pentafluorophenyl) borate, sodium [B {3, 5-(CF$_3$)$_2$ C$_6$F$_3$}$_4$], [H (OEt$_2$)$_1$[B {3, 5-(CF$_3$)$_2$C$_6$F$_3$)$_4$], triaryl carbenium tetraarylborates, N,N-dialkylanilinium borate salts, N,N-dimethylanilinium tetrakis(pentafluorophenyl)borate, N,N-diethylanilinium tetra(phenyl)borate, N,N-2,4,6-pentamethylanilinium tetraphenyl-borate, chemically related Group 13 compounds; dialkyl ammonium borate salts, di(i-propyl)ammonium tetrakis(pentafluorophenyl)borate, dicyclohexylammonium tetra(phenyl)boron, triaryl phosphonium borate salts, triphenylphosphonium tetraphenylborate, tri(methylphenyl)phosphonium tetra(phenyl)borate, tri(dimethylphenyl)phosphonium tetra(phenyl)borate, chemically related Group 13 anions, chemically related non-coordinating anions and combinations thereof.

15. The composition of claim 1, wherein the hydrozirconated matrix is prepared from polymers having particle diameters ranging from 2 nm to 1000 μm.

* * * * *